United States Patent
Ghosh et al.

(10) Patent No.: US 6,749,901 B1
(45) Date of Patent: Jun. 15, 2004

(54) BRAZING METHOD FOR WORKPIECE HAVING RELATIVELY HIGHER MASS PORTION

(75) Inventors: Kunal Ghosh, Amherst, NY (US); Michael Czajkowski, Lockport, NY (US); Frank Joseph Leitch, North Tonawanda, NY (US); Christopher Alfred Fuller, Buffalo, NY (US); Lorraine Anders, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 847 days.

(21) Appl. No.: 09/645,384

(22) Filed: Aug. 24, 2000

(51) Int. Cl.⁷ .................................................. B05D 1/08
(52) U.S. Cl. ...................... 427/448; 427/456; 228/183; 228/261
(58) Field of Search ................. 427/448, 455, 427/456; 228/183, 256, 261, 214, 203; 165/133

(56) References Cited

U.S. PATENT DOCUMENTS

| | | | | | |
|---|---|---|---|---|---|
| 4,799,543 A | * | 1/1989 | Iversen et al. | ............... | 165/135 |
| 5,148,986 A | | 9/1992 | Rusch | ......................... | 239/219 |
| 5,322,209 A | | 6/1994 | Barten et al. | ............... | 228/183 |

* cited by examiner

Primary Examiner—Katherine A. Bareford
(74) Attorney, Agent, or Firm—Patrick M. Griffin

(57) ABSTRACT

A condenser that is to be brazed in a radiant energy oven has a significant, localized mass differential which would, without further treatment, create a significant temperature differential across the condenser in the braze oven. This is compensated for, in the method of the invention, by thermally spraying onto the surface of the higher mass portion a rough surface layer of a compatible material that increases the emissivity of that portion sufficiently, relative to the rest of the condenser, to decrease the temperature differential that would otherwise occur.

4 Claims, 4 Drawing Sheets

BRAZING METHOD FOR WORKPIECE HAVING RELATIVELY HIGHER MASS PORTION

TECHNICAL FIELD

This invention relates to oven brazing in general, and specifically to a method for improving the brazing quality of a heat exchanger or the like that has a significant mass asymmetry.

BACKGROUND OF THE INVENTION

Braze ovens used to manufacture aluminum heat exchangers can be roughly divided into the radiant and convective type, distinguished by the heating method involved. Radiant braze ovens have an elongated, double walled tubular muffle, heated by a radiant heat source, typically an electric resistance wire. The heat exchanger workpiece is run through the muffle, and heated to braze temperature, around 1100 to 1200 Degrees F., by radiant energy. In a convective braze oven, heated air is blown over the workpiece to heat it. Each technique has its own unique advantages and drawbacks.

A potential problem with either brazing method involves mass differentials unique to the heat exchanger itself. In most cases, the mass differential is a symmetrical one. That is, a relatively low mass central core, comprising thin tubes and thin corrugated fins, is flanked on each side by heavier, but equally massive, manifold tanks. The tanks will heat up to braze temperature more slowly than the relatively less massive core. At least in the case of convective brazing, a known solution is to preferentially direct a greater volume or flow rate of heated air at and over the more massive side tanks, as disclosed in U.S. Pat. No. 5,322,209. This, of course, is inapplicable in the case of a radiant oven.

In the case of a radiant oven, the mass differential issue is exacerbated in a situation where the mass differential is also asymmetric. For example, a heat exchanger such as a condenser may have one manifold tank on one side that is considerably more massive than the tank on the opposite side, as when a receiver dehydrator tank is integrated into it. Since radiant heating rate is a function of how readily the surface of the part absorbs radiation, one known technique to compensate for the mass differential is to create a counterbalancing thermal absorption differential. For example, if each of the different mass tanks has a relatively shiny surface, the surface of the more massive tank may be dulled somehow, made more absorbent to a compensating degree. Black paint is one obvious approach, but it would be difficult to find a paint that would survive the temperatures involved. Another known technique is to shot blast the surface of the more massive tank, or acid etch it, thereby dulling and roughening it. These are both environmentally undesirable, expensive, and difficult to control or tailor to differing conditions.

SUMMARY OF THE INVENTION

The subject invention provides a novel method of varying surface thermal absorption rate which, rather than removing material from the surface, or painting it, modifies the surface absorbtivity by adding a layer of temperature resistant material that varies the surface roughness sufficiently to create the desired absorbtivity differential.

In the embodiment disclosed, a high temperature material, such as steel metal powder, is flame sprayed onto the surface of the more massive areas of the workpiece. The powder grain size and other spray parameters are chosen to give a layer of sufficiently increased surface roughness to in turn increase the surface absorbtivity sufficiently to compensate for the mass differential. Heating within the braze oven is more even and effective.

BRIEF DESCRIPTION OF THE DRAWINGS

These and other features of the invention will appear from the following written description, and from the drawings, in which.

DESCRIPTION OF THE PREFERRED EMBODIMENT

Figure 1:
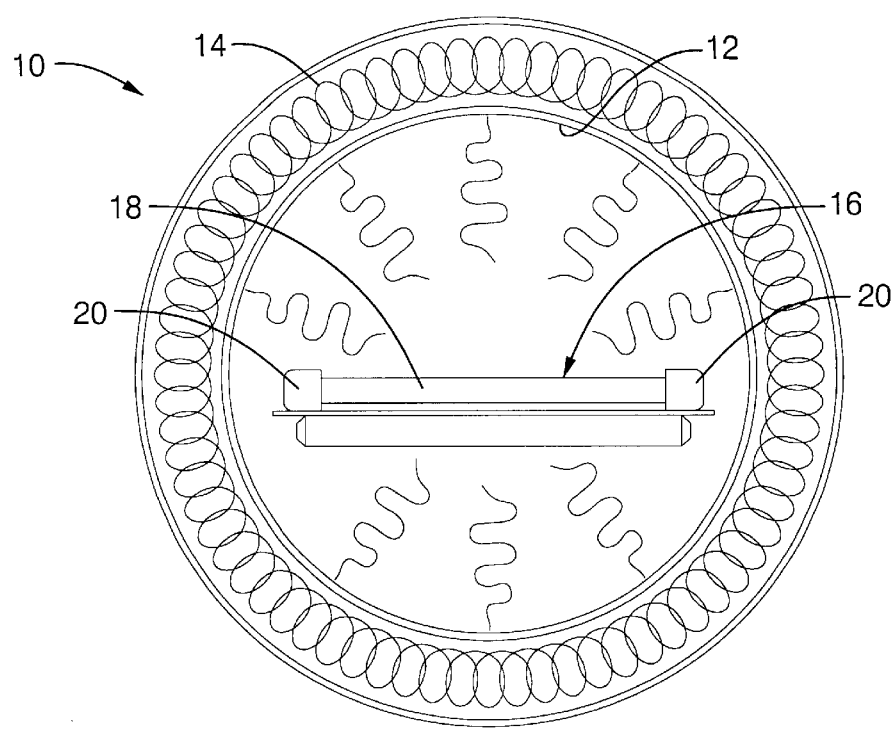
FIG. 1 is a schematic cross section of a typical radiant muffle type braze oven and heat exchanger workpiece.

Referring first to FIG. 1, a radiant, muffle type oven, indicated generally at 10, has a double walled shell 12 within which an electric resistance element 14 produces radiant energy. The radiant energy is ultimately radiated substantially evenly to a workpiece indicated generally at 16, as shown by the wavy lines. As disclosed, workpiece 16 is an all metal heat exchanger, such as a condenser, which has a relatively lighter central core 18 flanked by relatively heavier manifold tanks 20. The heavier tanks 20 will heat more slowly than core 18. However, they will at least heat evenly, being of equal mass, and the whole workpiece 16 can generally be successfully brought to braze temperature within an acceptable time, if the mass differential is not too great.

Figure 2:
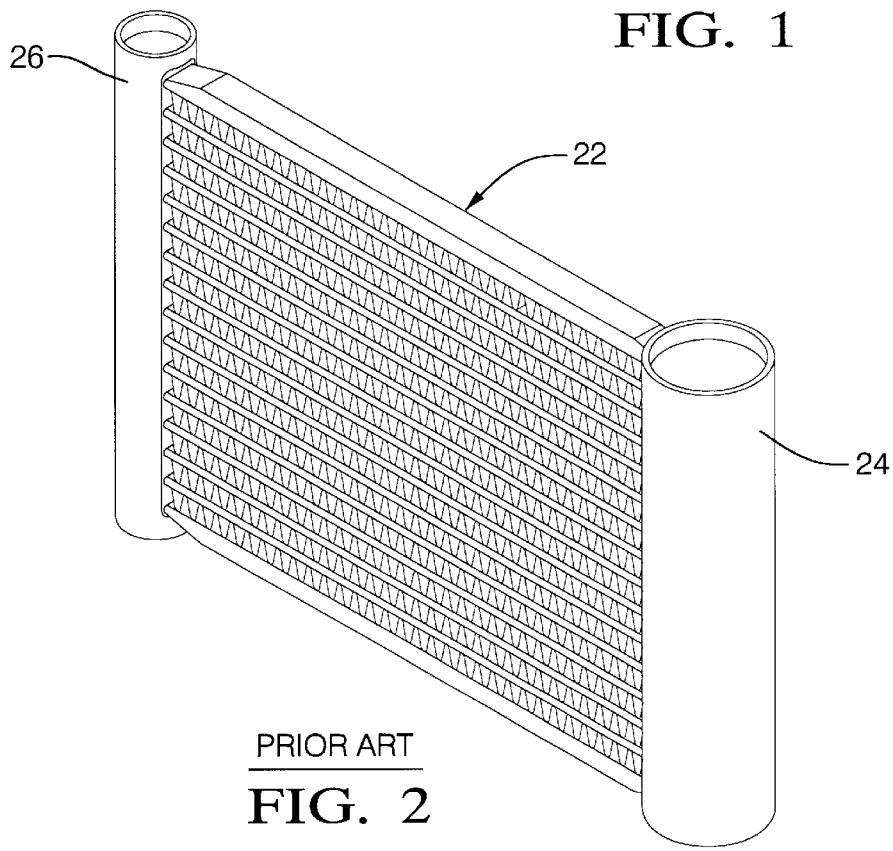
FIG. 2 is a perspective view of a heat exchanger with a large, and also asymmetrical, mass differential.

However, as illustrated in FIG. 2, some workpieces, such as the condenser indicated generally at 22, present a more serious problem. One manifold tank 24 is significantly larger and more massive than the other 26, because it incorporates a unitary receiver dehydrator, or RD. The mass differential between the two can be on the order of 400 g, and both elements are generally comprised of a shiny surfaced aluminum extrusion, equally reflective. Consequently, in the braze oven 10, a temperature differential of as much as 60 degrees F can arise between the rest of the core and the larger RD tank 24. Every manifold tank like 24 is formed with spaced slots containing inserted tube ends, the interfaces of which require that a fully melted liquid braze layer be drawn in by capillary action in order to be adequately sealed. If this portion of the workpiece lags the rest in reaching full braze melt temperature, because of the differential noted, it can jeopardize full braze, or require a longer and less productive braze time.

Figure 3:
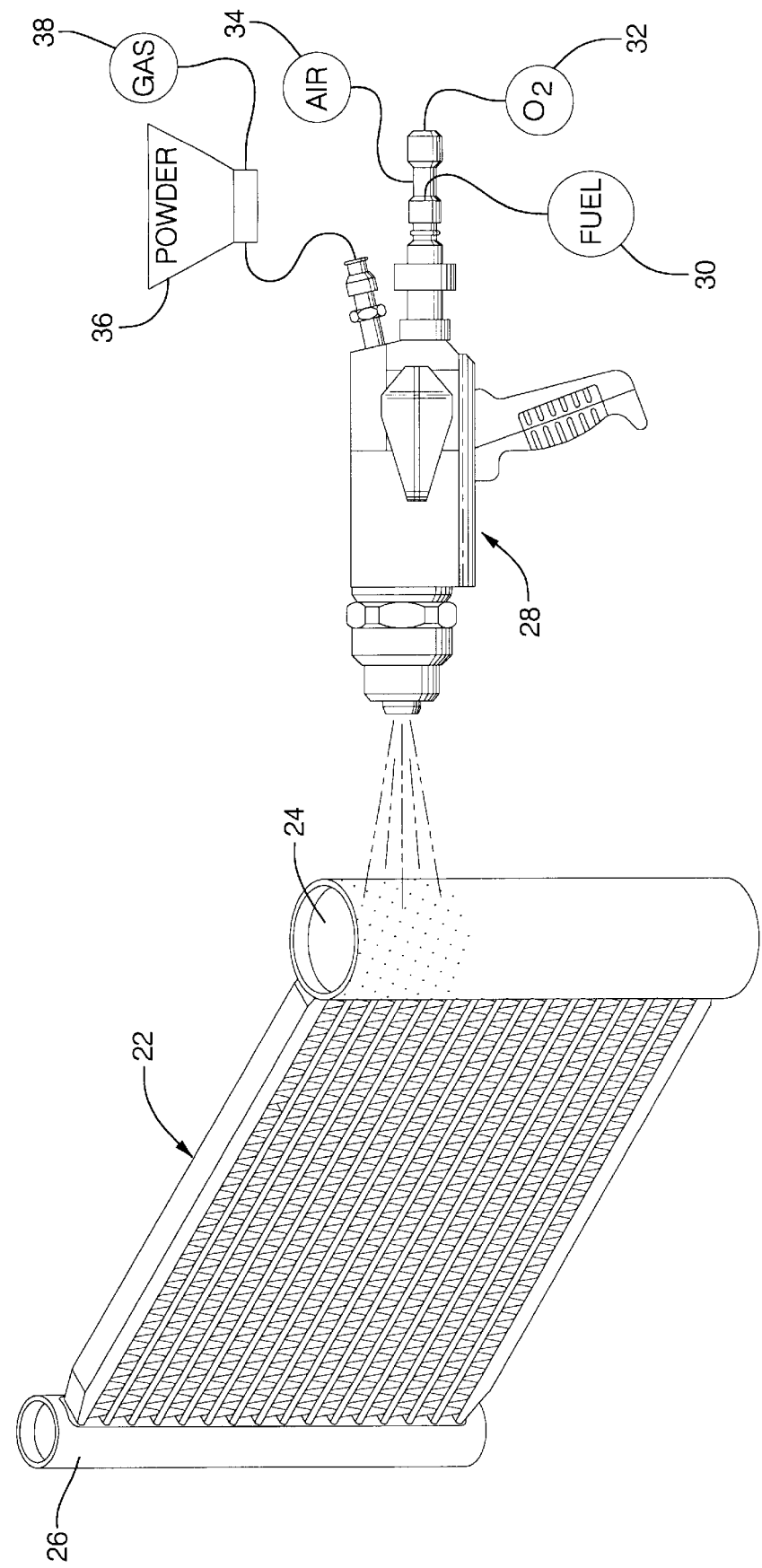
FIG. 3 is a view of the workpiece being treated according to the method of the invention.

Referring next to FIG. 3, a thermal spray gun, indicated generally at 28, is of the type known in the industry as HVOF, which stands for high velocity oxygen fuel. A high pressure source of fuel 30, such as propylene, oxygen 32, and air 34 are all injected into the non illustrated combustion chamber of gun 28, providing a high temperature, high speed flame, easily able to achieve temperatures of several thousand degrees F. This is well above the melting point of metal powders such as aluminum, iron or steel. Typical gas pressures used are about 60 psi above atmospheric pressure. Also injected into the combustion chamber, from a hopper 36, is a metal or other fusible or heat softenable material powder. Hopper 36 is emptied by a pressurized source 38 of air or other non combustible gas, supplied at a pressure high enough to achieve the desired powder feed rate. The high temperature flame softens and propels the metal particles out the gun 28 in a spray, which strikes and fuses to the surface of any desired workpiece. Typically, such a layer would be a bronze or steel or the like, applied to a soft surface as a bearing or wear layer. Such a layer is generally machined or polished smooth after application, as surface roughness would be considered a defect. Here, a very different effect is desired and achieved.

Still referring to FIG. 3, according to the invention, gun 28 is used to apply an outer layer to the more massive RD tank 24 only. Adjacent surfaces of the condenser 22 may be suitably masked. In one exemplary embodiment, the layer applied is formed from low carbon steel powder. Such powders used in flame spraying applications are commercially available and generally formed as atomized particles or grains. The powder used here has a chemical composition, by weight, of 97.86% iron, 1.80% manganese, and a particle size in which 2% of the metal powder grains are coarser than 270 mesh, 15% are finer than 325 mesh, and the remainder fall between those two mesh sizes. "Mesh" is a term of art used in the metal powder industry, which indicates the percentage of powder grains which will pass through a standard sieve or screen. The metal powder is fed from hopper 36 as indicated above, by a feeder gas pressure sufficient to achieve a feed rate in the range of 0.8–41 b/h. Other exemplary parameters include a spray distance (distance between the nozzle of gun 28 and the surface to sprayed) in the range of 4–5" and a "traverse rate", {the rate at which the gun 28 is moved back and forth or laterally relative to the surface) in the range of 750–1500 mm/min. The surface or "substrate" of RD tank 24 is preferably untreated, which is the most economic alternative, although surfaces to be flame sprayed are often sandblasted or roughened first, in order to enhance adhesion and thickness of the sprayed layer to the surface. Here, however, thickness of the added layer is not the priority that it is with conventional flame spraying. The tank 24 is also pre heated slightly, to around 250–350 degrees F., which is also typically done so as to also enhance adhesion and prevent too rapid cooling. As with conventional flame spray processes, the spraying itself, despite its high temperature, does not raise the temperature of the substrate material itself to more than a few hundred degrees F, well below the braze melt temperature. Therefore, the integrity of the braze layer on other parts of the condenser 22 is not threatened.

Figure 4:
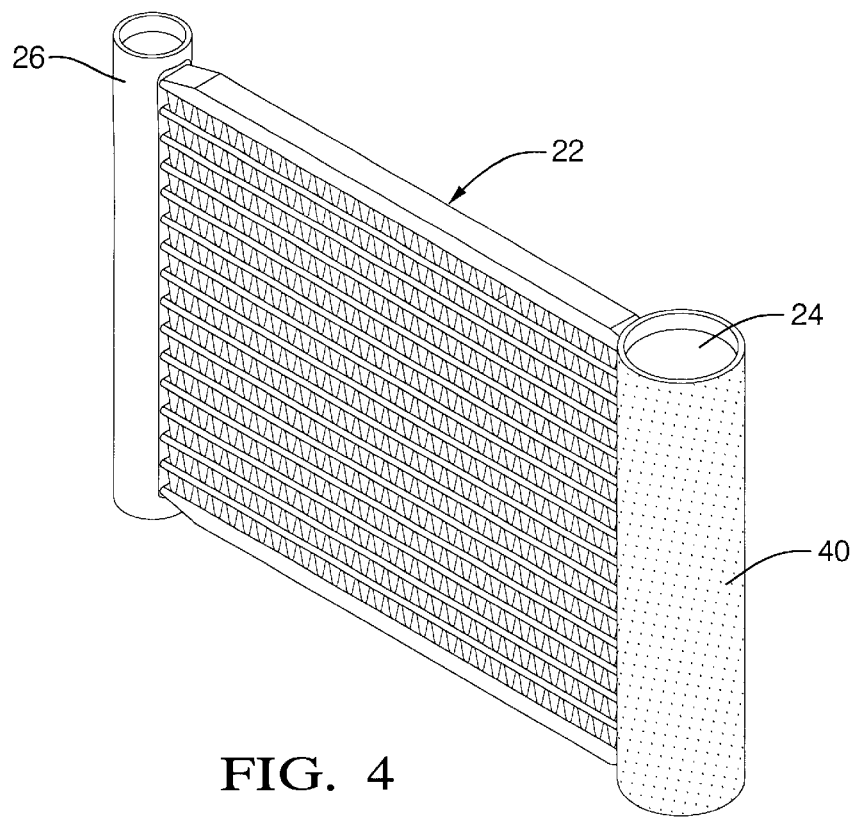
FIG. 4 is a view of a completed workpiece.

Referring next to FIG. 4, the final result is a condenser 22 in which the surface of the more massive tank 24 is substantially uniformly coated with a thin layer 40 of the low carbon steel material, generally less than 0.001 inch thick, which is significantly thinner than what would normally be considered the minimum useful thickness for a flame sprayed layer of metal. Layer 40, while thin, has a surface roughness of 4.6 Ra and 31.7Rt. This is substantially rougher than the untreated surface of RD tank 24, which has a measured roughness of 0.08Ra, and 0.7 Rt. As noted, the final step in a flame spraying process would typically be a smoothing operation. Moreover, such a layer would also not normally be applied at all to a surface like the outside of tank 24 that had no bearing or wear function at all. In effect, being as thin and rough as it is, a flame sprayed layer like 40 would normally be considered defective and ineffective. Regardless, it achieves the very different objective of the invention, as described below.

Figure 5:
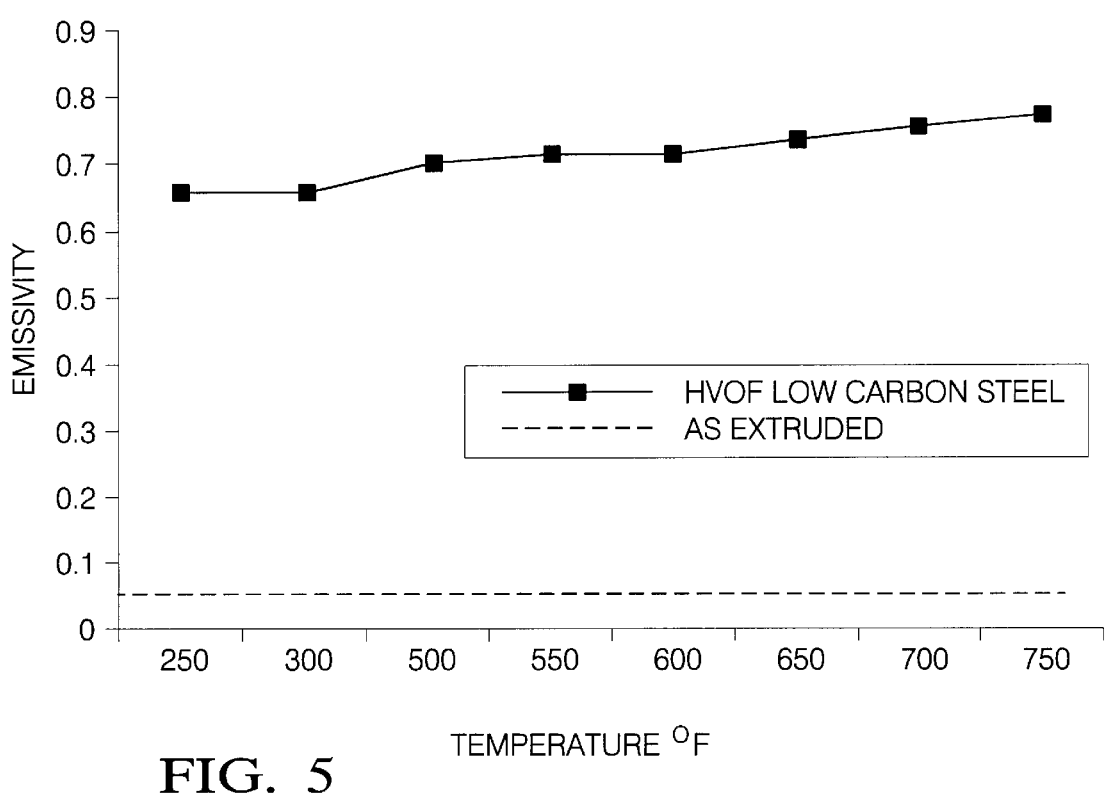
FIG. 5 is a graph showing the thermal emissivity of the treated portion of the workpiece compared to the untreated surfaces.

Referring next to FIG. 5, a graph indicates the value of the emissivity of the as sprayed RD tank 24 as temperature rises. Emissivity is a somewhat confusingly named term that indicates the ratio of the energy emitted by any real world body to that emitted by a presumptive "black body", which is 1.0. A "black body" is both the perfect absorber of radiant energy impinging on it, and the perfect emitter of radiant energy from itself, at a given temperature. Therefore, the emissivity of an actual body is always less than 1.0, but the higher it is the more absorptive, and the less reflective, it is. So, higher emissivity may be read as indicating higher absorbtivity as well. As seen in FIG. 5, the emissivity of tank 24 as treated with the layer 40 of thermal sprayed low carbon steel ranges from just below to just above 0.7, leveling off as temperature rises. Though measured only up to approximately 750 degrees F., it is clear that the emissivity value would hold up through the higher braze temperatures described above. The emissivity measured is significantly higher than for the surface of the shiny, untreated surface of tank 24, which is well under 0.1, as indicated on the same graph. Furthermore, even a sandblasted surface was measured to have an emissivity under 0.4 at the highest.

Figure 6:
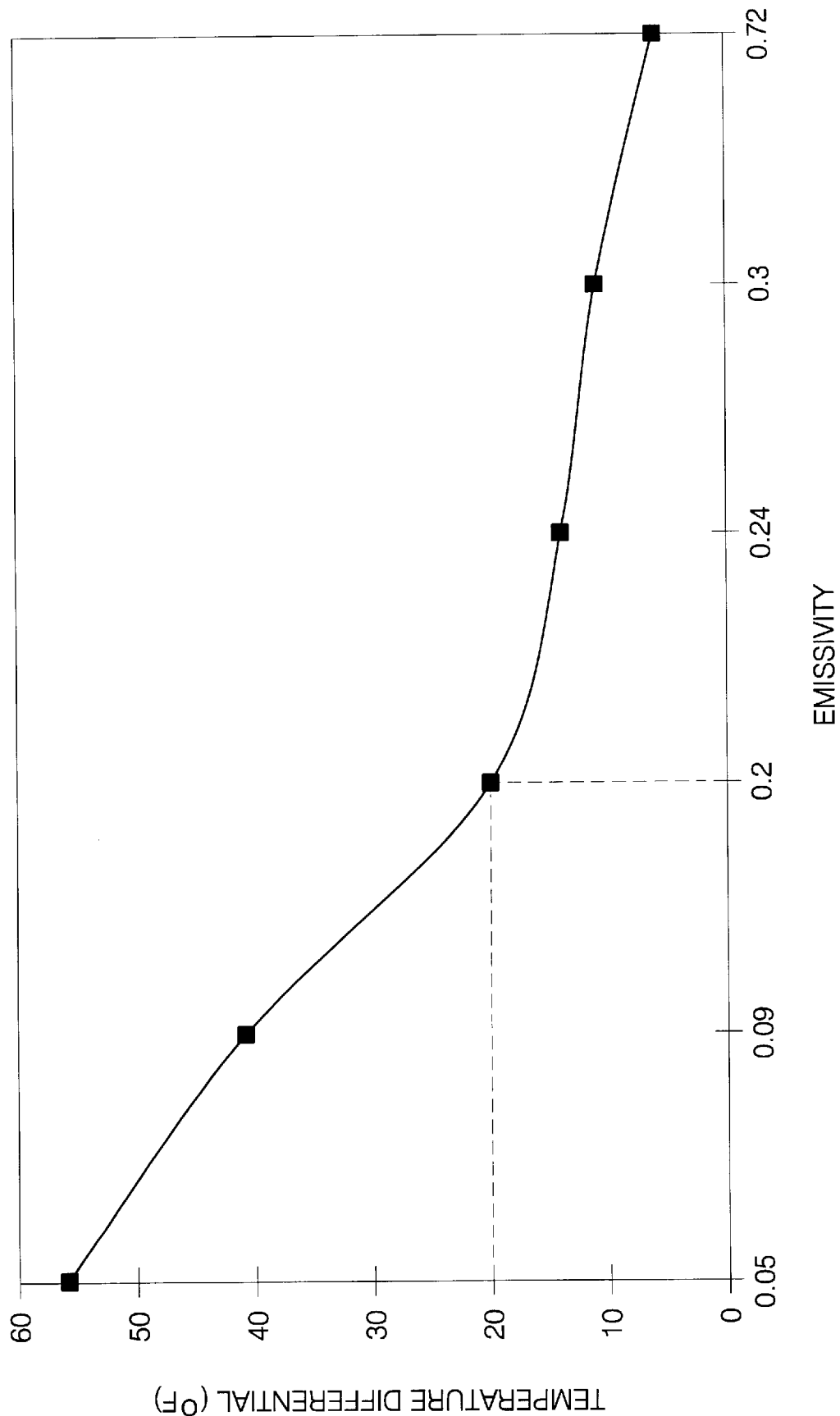
FIG. 6 shows the resultant temperature differential between treated and untreated portions of the workpiece, as a function of various emissivity values of the treated portion of the workpiece.

Referring next to FIG. 6, the relationship of emissivity of the higher mass tank 24 to the temperature differential created relative to the rest of the condenser 2, is shown. In the braze oven, the thermal absorption and heating rate of the emissivity enhanced portion of the workpiece leads to a very significant decrease in the temperature differential created. As shown, the temperature differential falls to approximately 20 degrees, as opposed to well over 50 degrees for an untreated surface, when an emissivity of substantially 0.2 or above is achieved. That "threshold" level of emissivity is easily achieved and exceeded by the layer 40 sprayed on as described above. The higher emissivity is a result not of the material per se or its color, but is rather a result of the greater surface roughness added by layer 40, creating decreased reflectivity or "shininess," and also creating an effectively increased surface area available to absorb radiant energy.

Again, this is a very different task for a flame spraying process, the objective of which is generally a relatively thick and smooth layer, intended to provide wear resistance, electrical conductivity, corrosion resistance, or some other result which is an inherent feature of the metal itself. That is, bronze is inherently a good bearing material, copper is conductive, zinc resists corrosion. Here, the objective is not to take advantage of an inherent characteristic of the sprayed material, but to achieve an increased surface roughness that is conventionally achieved by removing material, as by sandblasting. The net result is an even higher emissivity than that achieved by removing material, and the layer 40 will hold up in the braze oven as well as the base or substrate material, unlike a black paint.

Variations in the method described above could be made. The technique would be applicable to any workpiece with a localized mass differential, not necessarily just an asymmetrical mass differential. That is, the two side tanks might be equally massive, yet so much more massive than the rest of the core as to create the same problem. Greater or lesser mass differentials would require greater or lesser modifications of the surface emissivity. Fundamentally, a practitioner wishing to use a material and parameters other than those described in detail above would, knowing the braze temperature involved, choose a compatible surface material to be sprayed that had a melting temperature comfortably above that of braze layer on the workpiece. By compatible, it is meant that the surface material to be added, and the substrate to which it was to be added, would have no dielectric, thermal expansion, or other inconsistencies that would cause one material to destroy, or not adhere to, the other. This could be easily done, as the metal of the substrate itself, or any metal with a higher melting temperature than the substrate itself, would work. As noted, it would be almost impossible to choose such a metal that was not also amendable to flame spraying, given the very high temperatures that it can achieve, much higher than common braze melt temperatures. Then, a brief empirical study would find the spray parameters, including metal particle size, spray distance, traverse rate, and powder feed rate, which would achieve that level of enhanced surface roughness which, in turn, would create an enhanced emissivity above the "threshold" of approximately 0.2 that has been found to be effective. The inventors found no hard and fast correlation between surface roughness and emissivity values per se, although coarser grained powders, all other things being equal, can be expected to yield rougher sprayed surfaces. Again, many of the assumptions of what makes for a "good" flame sprayed layer may be inapplicable. For example, a less dense and complete layer may well be "rougher", and best achieved by metal powder particle sizes larger than, and spray distances and traverse rates greater than, those that would normally be expected not to create a conventionally dense and smooth layer. Other well known thermal spray processes exist other than HVOF, such as plasma or electric arc spray, which also serve to heat soften and propel a spray of metal or ceramic particles, sometimes melted from a wire, rather than a powdered source. Therefore, it will be understood that it is not intended to limit the invention to just the embodiment disclosed.

What is claimed is:

1. For use with a workpiece to be brazed by being heated by radiant energy to a predetermined braze temperature, said workpiece having a portion which is of significantly higher mass than the remainder of the workpiece and consequently subject to a temperature differential relative to the remainder of the workpiece during the braze process, a method to decrease said temperature differential, comprising the steps of, choosing a compatible surface material that has a melt temperature significantly higher than said predetermined braze temperature, thermally spraying said surface material onto said higher mass portion of said workpiece at spray parameters suitable to cause an enhanced surface roughness on said higher mass workpiece portion that is sufficient to in turn create an emissivity for said higher mass workpiece that is sufficiently enhanced to increase the energy absorption rate of said higher mass workpiece sufficiently to substantially reduce said temperature differential.

2. A method according to claim 1, further characterized in that the initial emissivity of said higher mass workpiece portion is substantially less than 0.2, and is enhanced by said thermally sprayed surface material to at least 0.2.

3. A method according to claim 2, further characterized in that said workpiece comprises substantially aluminum and said compatible surface material is a low carbon steel.

4. A method according to claim 1, further characterized in that said compatible surface material is a metal powder that is flame sprayed.

* * * * *